Nov. 6, 1962 C. E. CRAIG 3,062,076
TELESCOPING DRILL GUIDE OR BORING JIG
Filed Aug. 2, 1961 2 Sheets-Sheet 1

INVENTOR.
CARL E. CRAIG
BY
ATTORNEY

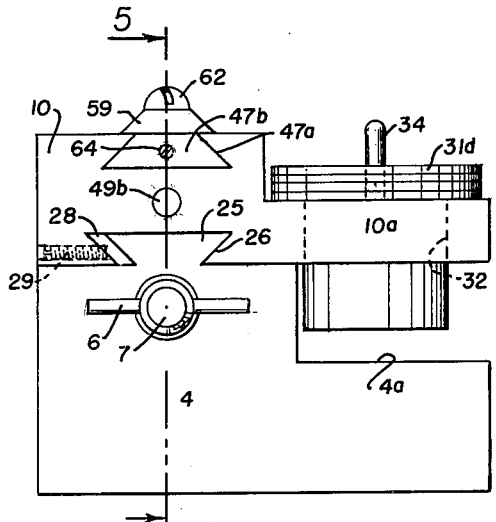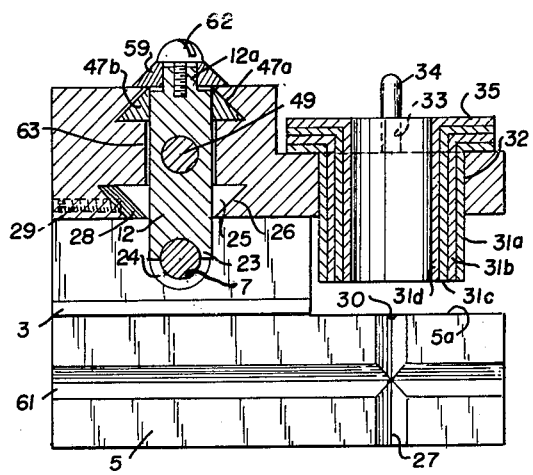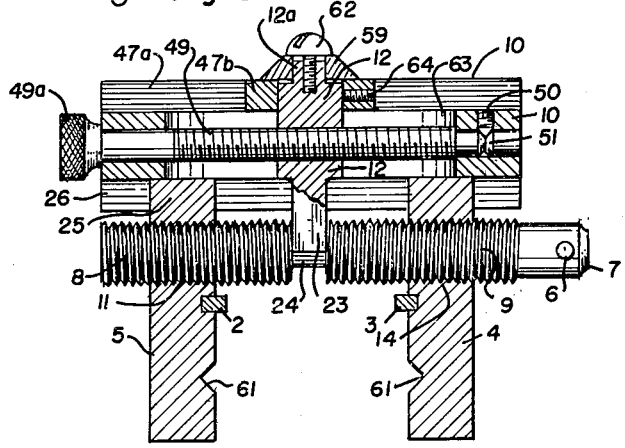

United States Patent Office 3,062,076
Patented Nov. 6, 1962

3,062,076
TELESCOPING DRILL GUIDE OR BORING JIG
Carl E. Craig, 1307 16th Ave., Greeley, Colo.
Filed Aug. 2, 1961, Ser. No. 128,754
7 Claims. (Cl. 77—62)

This invention relates to drill guides used in the woodworking industry, as where dowel pins are used to join edges of abutting pieces together in a plane, for example.

The main objects of this invention are:

First, in a device of the class described, to provide a plurality of more than two different inside diameter size guide bores, and with each slidably and snugly vertically telescoping within and upon another thereof, except with the largest outersize one so fitting within only one master guide opening provided for the purpose in the device, to adapt the device for use with different size drills.

Second, in such a device having only one master guide opening, to provide a plurality of cylindrical telescoping guide bores, with relation to each other, and with the largest outersize one adapted to fit within said master opening, and with each cylindrical guide bore having a like outside diameter flat collar and with each collar having a like size and spaced opening therein, and a studpost holding means projecting from the device adjacent said master opening the post being adapted for radially holding the telescoping guide bores, telescopically seated within one another and with the outer one within the master opening and the collar opening of each guide bore each fitting snugly and removably over said post, during use of the device with such guide bores.

Third, to provide a self-centering boring jig, as it is clampedly secured onto the edge of a board, and to provide an off-center adjusting means, separate from the self-centering means, whereby the center position of the master opening of the device, resulting from its self-centering, may be adjusted or varied upon use when such may be desired, by the off-center adjusting means.

Fourth, to provide such a device of sturdy and practical construction, and yet so simple that operational use thereof will be self-evident to hobby-novices as well as to experts.

Fifth, such other and further objects as will be apparent to those skilled in the art to which it appertains, from the preferred embodiment herein described and shown in the accompanying drawings, in which:

FIGURE 3 is a side view thereof looking in the direction of the arrow 3 of FIGURE 1;

FIGURE 4 is a vertical cross-sectional view thereof, taken on the line 4—4 and looking in the direction of the arrows 4 of FIGURE 1;

FIGURE 5 is another vertical cross-sectional view thereof, taken on the line 5—5 of FIGURE 3 and looking in the direction of the arrows;

Figure 1:
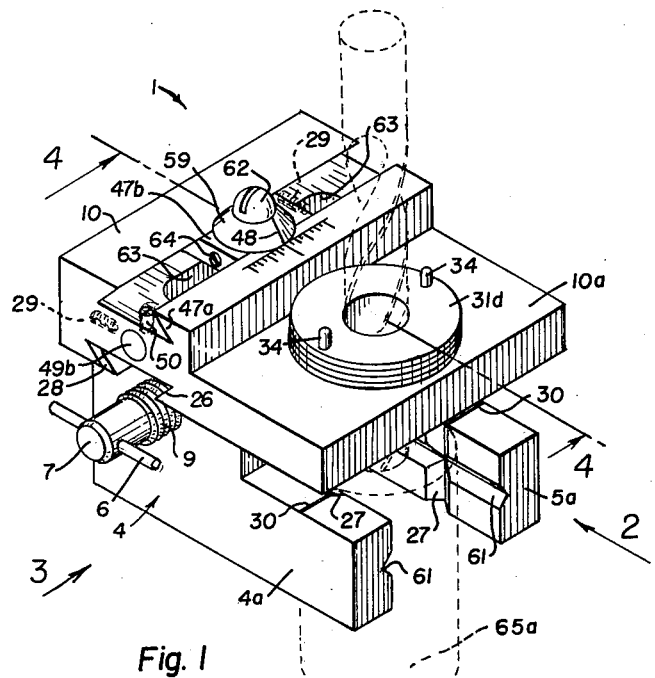
FIGURE 1 is an isometric perspective view of my novel telescoping drill guide device, indicated generally as 1.
Figure 8:
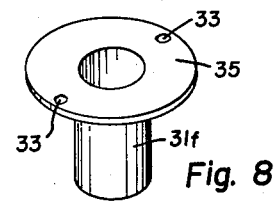
FIGURE 8 is an elevational view of another of my guides, 31f, illustrative of the outside diameter thereof being adapted for slidable and snug downward insert within the inside diameter opening of guide 31e.
Figure 7:
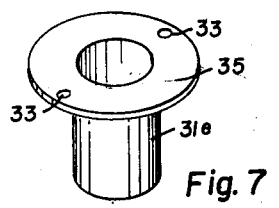
FIGURE 7 is an elevational view of one of my cylindrical drill guides, 31e.

My device, indicated generally as 1, has a like pair of opposing side plates, 4 and 5, each having a step-down portion, 4a and 5a, respectively, as shown in FIGURES 1, 3 and 4. The upper higher portion edge of each side plate 4 and 5 has an integral and aligned male dove-tail shaped portion formed thereon and extending upwardly therefrom, and indicated as 25. I use a step-down top plate 10, having a thinner portion 10a, as illustrated in FIGS. 1, 3 and 4, and on the under side of the thicker portion thereof I provide a transverse female dove-tail slot 26 formed therein, with slot 26 adapted for dove-tail slidable transverse meshing of the male projections 25 of the sides therein, as shown. Aligned internally screw-threaded like size openings 11 and 14 are provided in each side plate 5 and 4, respectively, for screw-operably receiving therein a double acting master-clamping screw bolt 7 therein. There is a removable handle 6 at an extended end of bolt 7. Screw-bolt 7 has a central annular groove 24, as illustrated, and the external screw threads of 7 on each side of that groove are of common size and direction to the internal threads of openings 11 and 14, respectively, as illustrated in FIG. 5, with the threads 8 and of the opening 11, illustrated in FIG. 5 as being to the left of groove 24, being right hand direction threads, and with the threads 9 of 7, illustrated there as to the right of groove 24, being left hand direction threads. Thus a turning of master clamping bolt 7, having opposing threads of equal size, will effect a like amount of movement of the sides 4 and 5 equi-distantly toward and away from the meeting plane of and between the sides 4 and 5, upon a right hand or a left hand turning of 7, respectively. It will be seen that top plate 10, with its female dove-tail slot 26 in right angular association with male dove-tail projections 25 of the sides 4 and 5, acts as a guide means in transverse movement of the said sides 4 and 5 upon turning of the master clamping screw 7 just explained.

I provide only one vertical master bore opening 32 in the top plate 10, centrally of the step-down portion 10a thereof. Adjacent opening 32 I provide a like pair of rigid posts 34 projecting upwardly therefrom, in a projected diametrical opposing relationship with relation to that opening, as illustrated for reason to be explained.

Figure 2:
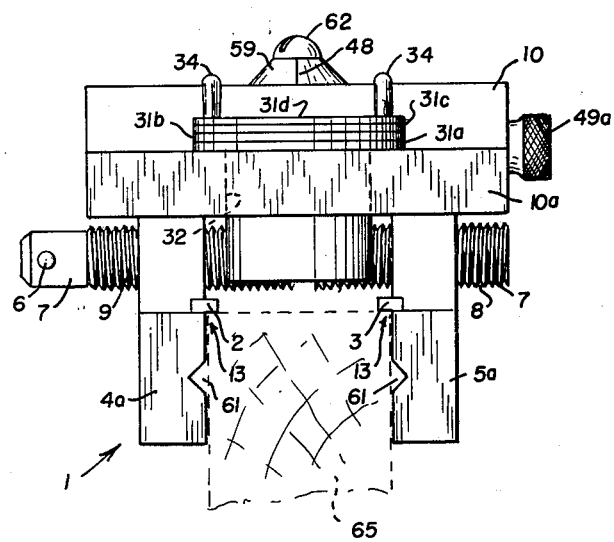
FIGURE 2 is an end view thereof looking in the direction of the arrow 2 of FIGURE 1.

The side clamping plates, 4 and 5, are each provided with aligned horizontal opposing work piece stop guides, 3 and 2, respectively, being adapted to ride on the top edge of the board work piece, as 65 of FIG. 2, as that work piece is clampingly held between the sides 4 and 5, at point indicated as 13. Each of the sides 4 and 5 are also provided with opposing pairs of grooves 61 and 27 formed therein. 27 indicates an opposing pair of aligned like grooves, vertically on the inside of opposing sides 4 and 5 and centered with relation to top plate master guide opening 32, adapted for the holding of round objects by my device, and to be drilled, as will be understood, with such an object indicated by the dotted lines 65a of FIG. 1. I also provide a pair of such grooves 61, in opposing relationship to each other, and aligned horizontally on the inside of the sides, adapted for the holding of round objects horizontally by the sides, when occasion requires for such drilling. I insert a flat parallelogram-like gib 28 horizontally between the side edges of the male and female dove-tails, 25 and 26, as illustrated in FIGS. 1, 3 and 4, of configuration shown, to assure a snug slidable fit at all times between 25 and 26, securing the gib 28 in place by pressure-retaining screws 29, with the latter screw seated horizontally through the adjacent portion of top plate 10 and from the outside thereof, it being understood that screws 29 may be screw seated against 28 to assure such a fit between 25 and 26. Pressure against gib 28, by screws 29, causes the gib 28 in turn to press against one adjacent side of male dove-tails 25, of the side plates, thus causing the male members 25 to ride between and against the other side of the female slot and the gib, thereby eliminating any misalignment of the centering process due to looseness between 25 and 26.

I provide indicia line grooves 30, on the upper edges 4a and 5a of the side plates, and said grooves are in vertical alignment with the center of the vertical holding grooves 27 and are also in exact alignment with the center of the master bore opening 32 of the top plate, for obvious sighting purpose by the workman, in the use of my device, in placing the work piece, as 65, with the center of the hole desired to be drilled in alignment with a projected sighting line 27—27 of the said sides.

Figure 6:
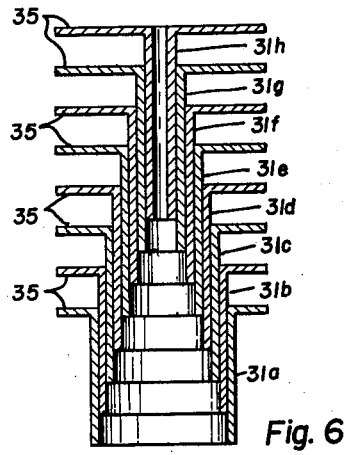
FIGURE 6 is an expanded vertical cross-sectional view of a set of eight of my telescoping drill guides 31a to 31h, showing their telescopic association with each other.

I provide a plurality of equal wall thickness and varied diameter cylindrical telescoping bit guides, 31a–31h, telescopically fitting slidably and snugly together, as illustrated in FIG. 6, and with each having a like outside diameter flat peripheral collar 35 at one of its ends, and with each collar having a like positioned pair of diametrically opposed openings 33 formed therein. Each of the collar openings is of a size designed to fit slidably and snugly over a post 34. I secure a pair of like rigid posts 34 adjacent master guide opening 32, and in diametrical opposed relationship with relation to the center of that opening, extending vertically from portion 10a of the top plate. The posts 34 are of like size, and are adapted to fit snugly and slidably vertically within openings 33 of the guide collars, when the latter are placed as illustrated in FIGS. 1, 2, 3 and 4. When my cylindrical telescoping guides, 31a–31h, are placed one within another, as illustrated, the collars of each overlap evenly one on another and the openings 33 of each seat down over the posts 34. Posts 34 thus act to secure my telescoping guide members 31a–31h from any radial movement thereof and within the master opening 32, as illustrated in FIG. 1. In the embodiment of my invention illustrated, my first cylindrical bit guide, 31a, has an outside diameter, with relation to the inside diameter of the master guide bore opening 32, adapting it to fit slidably and snugly downwardly within the master opening 32; and each successively smaller cylindrical bit guide, 31b–31h, is uniformly of less outside diameter for reason of adapting it to fit slidably and telescopically snugly downwardly within the inside diameter cylindrical opening its outer adjacent cylindrical guide, as illustrated in FIG. 6. It will thus be seen that when a flat board work piece, 65 of FIG. 2, for example, is clampingly held by the equi-distantly moving toward each other sides 4 and 5, as a result of the right hand turning of master clamping screw 7, the master guide bore opening 32 of top plate portion 10a and thus at all times centrally between the sides 4 and 5, that the work piece 65 will be held by said sides with the center of the upper edge portion of 65 in exact alignment with the center of the master guide opening 32. In such side clamping held alignment, just mentioned, and called self-centering, the exact center of the inside diameter of the inside one of any plurality of my cylindrical telescoping bit guides as may then be in use, as, for example, as illustrated in FIG. 1, and FIG. 2, 31d, within opening 32, the center of the upper edge of the work piece will be in alignment with the diametrical center of the said inside guide 31d, or of the center of the smallest guide then in use. It is to be understood, that, instead of having eight of my telescoping cylindrical bit guides, as illustrated as 31a–31h, to telescopically reduce the diameter of my one master guide opening 32 to any desired size, there could be other set combinations or of lesser number, within the teaching of my invention, each having a common flat and outside diameter collar 35 with openings 33. For example, there could be three of my cylindrical bit guides, in terms of each being a one-quarter inch inside diameter reduction, with each guide having its cylindrical wall one-eighth of an inch thick, designed to step the one inch inside diameter master opening 32 down in reduction upon insert of each, successively, one-quarter of an inch, so as upon use of all three to reduce that inside diameter of 32 down to a one-quarter of an inch; or there could be any other combination of my novel telescoping bit guides, in terms of sets of each, for use with my device having only one master guide opening, 32.

The thicker vertical portion of my top plate 10 is provided with a horizontal cut-away vertical slot 63 therethrough, as illustrated in FIGS. 1, 5 and 4, and which slot 63 is below a second and upper surface female dovetail slot 47a also horizontally formed in the top of the thicker portion of 10. Both female dovetail slots 26 and 47a of the top plate are parallel with each other. A vertical guide retaining member 12, with a lowermost reduced extension 23 formed with a semi-circular concave end adapted to ride on the annular groove 24 of the master clamping screw 7, extends upwardly from 24 through cut-away slot 63, of the plate 10, and has its upper end 60 reduced into a neck tip 12a, as illustrated in FIGS. 4 and 5. A horizontally rectangular and vertically male dove-tail shaped block member 47b, adapted for fitting snugly and horizontally slidably within female dove-tail slot 47a, is placed on the upper end 60 of vertical guide member 12, as illustrated in FIGS. 4 and 5, and block 47b is held onto 12 by set screw 64 through 47b, thereby binding 47b thereto, and one function of 47b, so meshing with 47a and held to 12 by screw 64, in turn, is to hold central retaining member 12 from vertical movement and with its lower end in engagement with groove 24. I provide a bevelled indicia washer 59 on neck 12a over block 47b and of an outside diameter large enough to overlap the adjacent surface of top 10 adjacent slot 47a, and I secure washer 59 in place by a set screw 62 into 12a as illustrated. It will thus be seen that side plates 4 and 5 can be moved equi-distantly toward each other, by a right hand turning of master screw 7, as heretofore explained, until the inside surface of said plates 4 and 5 abut against reduced extension portion 23 of the central member 12. Further, that upon a turning of 7 that 12 is not thereby moved but rides on the annular groove 24, having its reduced end 23 held sideways between abutting larger screw portions 8 and 9 of 7 as 7 is turned, as illustrated in FIGS. 4 and 5.

Central retaining member 12, with its dove-tail male guide block 47b, in female slot 47a as explained, and an off-set adjusting screw member 49, parallel with clamping screw 7, with 49 carried by the top 10, and 49 screw threadedly extending through member 12, together comprise a manually operable offset drilling mechanism, for altering the self-centering guide bore 32 position with reference to the work piece, and which off-set adjusting mechanism I will now explain. I provide an internally screw-threaded opening through member 12, through which I screw-threadedly insert an off-set adjusting screw 49, and rotatably hold that screw 49 in place with relation to the top 10 and horizontally through the cut-away slot 63 thereof, suitably journalling the ends of 49 to the top 10 at the parts of 10 at each end of slot 63, and above the lower female dove-tail slot 26, as illustrated in FIG. 5. I have an enlarged end 49a of screw-bolt 49, in shoulder turnable relationship against the outside surface of the top 10 at one end of slot 63, and I rotatably secure a reduced round other end of 49 at 49b, in a journal opening for the purpose in the other portion of top 10 at the other end of slot 63, by forming an annular V-groove 51 on the periphery of 49b, and having the lower tapered end of a vertical set-screw 50, seated as illustrated through the top, to ride in that V-groove 51. Set screw 50, secured to the top plate, rotatably holds off-set screw 49 to and as a part of top 10, as will be seen from FIG. 5, for reason to be explained. A centering indicia guide line 48 is provided on bevelled washer 59, and a companion distance scale is provided on the upper surface of adjacent top plate 10 over which waser 59 extends, for convenient guide in the use of my off-set adjusting mechanism, and which mechanism, as explained, comprises parts 12—49—50—51—10—47a—47b—59—62 and 64. Set screw 62 is permitted to seat into neck 12a and in so doing binds the under surface of bevelled washer 59 tightly against the upper adjacent surface of top 10 having the indicia marks, thereby locking the top 10 from any possible horizontal movement, with relation to male members 47b, of 12, and 25—25 of the side plates, as might be caused from an unintentional turning of screw-bolt 49. As explained, 12 is held horizontally in one position at all times by the groove 24 of 7 and with relation thereto. When set screw 62 is seated tightly, then the off-set adjusting screw 49 cannot be turned since the top 10 is held against any horizontal movement on the male members, as explained. To operate the off-set adjusting mechanism, just explained, locking set-screw 62 must be first loosened, and then off-set adjusting screw-bolt 49 may be rotated. Since off-set adjusting screw 49 is rotatably held as a part of and with relation to top 10, against any separate endwise or longitudinal movement of 49 with relation to 10, by the lower end of bevelled set-screw pin 50 secured to 10, it will be seen, upon a rotation of screw-bolt 49, that the external screw threads of 49, in engagement with corresponding internal screw-threads of central member 12, will cause the adjusting bolt 49 to be in effect threaded longitudinally through opening 46 of 12 and thereby said bolt 49 will be moved end-wise through 46 of 12, and since 12 cannot move, the entire top plate 10, affixed to adjusting bolt 49 by pin and groove 50—51, will simultaneously with said movement of 49 be moved horizontally with and by such bolt 49 screw-end-wise movement through opening 46 of fixed central member 12. It will thus be seen, that upon a rotation of off-set adjusting screw-bolt 49, causing it to move end-wise with relation to fixed member 12, and carrying the entire top plate 10 with it, that said top movement is sideways on and by its female dove-tail slots 26 and 47a riding on their respective male adjacent dove-tail members, 25 of the side plates, and on 47b of the fixed central retaining member of 12, in horizontal sliding and meshing relationship therewith. A right hand turning of off-center adjusting screw 49, just explained, will cause the top plate 10 to be moved off center to the left with relation to the indicia line of indicia washer 59, as viewed in FIG. 5, and a left hand turning of 49 will move the top 10 to the right as so viewed. It will be understood that the off-set adjusting mechanism, just explained, is normally set with its indicia lines exactly on center, as shown in FIG. 1; and that it is when it is desired to adjust the position of the hole to be drilled in the work piece, as 65, to a distance off-set from the exact center, and which exact center is self-centered from use of my device master clamping-screw 7, heretofore explained, by the guide or guides in master opening 32, that then is when the off-set adjusting mechanism, just explained, is used, to effect a moving of master guide opening to the off-center point desired.

As many changes and modifications may be made, from the preferred embodiment of my invention herein shown and described, within the spirit and teaching thereof, I wish to be bound only by the hereunto claims.

What I claim and desire to secure by Letters Patent is:

1. In a drill jig device of the class described, comprising in combination, a pair of opposed side clamp members and a top plate guide means slidably associated therewith, a master clamping screw associated with the side members, said master clamping screw serving to move the side members slidably on the top plate guide means equi-distantly toward and away from the meeting plane of the side members, said top plate guide means having one master bore guide opening therein positioned in the plane of the meeting plane of the side clamping members, a first cylindrical telescoping guide bore member having a collar extending peripherally from one end thereof and being removably, slidably and snugly inserted down within said master guide bore opening and with said collar resting on the top plate, said collar having a vertical opening therein, a rigid post secured to said top plate and extending upwardly therefrom adjacent the master bore opening thereof, the collar vertical opening fitting snugly and slidably over said post when the first guide bore member is inserted down into the master bore opening for thereby effecting a radial holding of the first cylindrical guide bore member.

2. A drill jig device as defined in preceding claim 1, and characterized further by the addition of a second cylindrical guide bore member having a similar collar to that of the first guide bore member and having an identical opening in its collar also positioned to fit over said post when the second bore member is within the first bore member, said second bore guide member having an outside diameter adapting it to slidably and snugly fit down within said first guide bore member, and when said second guide bore member is down within the first guide bore member then its collar opening also fits slidably and snugly over said post.

3. A drill jig device of the class described, comprising the combination as included and described in preceding claim 1, and characterized by the addition of a screw off-set adjusting means for varying the center positioning of the master bore opening with relation to the side clamp members and carried by the top plate guide means, said off-set adjusting screw means effecting a moving of the top plate means on the side clamp members.

4. In a drill jig device, in combination, a pair of opposed side clamp members, a top plate guide means slidably associated with the side members, a self-centering master clamping screw associated with the side members and serving to move the side members slidably on the top plate guide means equi-distantly toward and away from the meeting plane of the side members, said top plate means having only one master bore guide opening therein positioned at the meeting plane of the side clamping members, a first cylindrical telescoping guide member having a collar extending peripherally from one end thereof and being adapted to fit slidably and snugly down within said master bore guide opening and with its collar resting on the top plate, said collar having a vertical opening therein adapted to fit over a post of the top plate when said first guide member is inserted down into the master bore guide opening, a rigid post extending upwardly from the top plate and being positioned adjacent the master bore guide opening, said post being adapted for effecting a radial holding of the first guide bore member when the latter is within the collar opening and with the collar opening having said post extending therethrough, and an additional plural number of similar telescoping guide members to the first one and each of a different size and each being adapted to fit snugly and slidably telescopically closed together and with the outer one of said additional guide members having its outside diameter adapted to fit snugly and slidably down into said first guide bore member, each of said additional guide bore members having a similar collar to that of the first guide bore member and each collar thereof having a like opening in identical position thereon to that of the first guide bore member, each of said openings of each collars of the guide bore members being in alignment and adapted to fit snugly and slidably over said post when the guide bore members are in closed telescopic arrangement with each other and down within said master bore guide opening of the top plate and with the collar of the outer and first guide bore member resting on the top plate.

5. A telescoping drill guide device combination as defined in preceding claim 4, and characterized further by the opposed side clamp members each having a shoulder abutment extending inwardly of the device and positioned in alignment with each other and a distance from the master guide opening of the top plate sufficiently greater than the protruded length of the telescoping guide members extending through said master opening to permit shavings to move below such telescoping members and being adapted for abutting the top edge of the work piece article clamped by the side members.

6. A boring jig device of the class described, comprising in combination, a top plate guide means having one master bore opening therein, a pair of opposed side clamping members slidably associated with the top plate means, a self-centering, with relation to the top plate, master clamping screw means associated with the side members and serving to move the side members slidably on the top plate equi-distantly toward and away from each other and with relation to the meeting plane of the side members, said meeting plane being in alignment with the center of the master bore guide opening of the top plate means, and a separate off-set adjusting means carried by the top plate means and serving to move the top plate with relation to the side clamp members and on the side clamp members for varying the position of the master bore opening with relation to said meeting plane after or before the work piece is clamped by the master screw means and independently of the master clamping screw means, and a plurality of cylindrical bore guide members telescopically associated together and with the outer one thereof having an outside diameter adapting it for snug slidable insert within the master bore guide opening of the top plate means, and each of the top plate means at a place adjacent said master guide opening and also each of the plurality of bore guide members having one or the other of a complemental male member or a matching female opening therein, each of the adjacent male members and its complemental female opening being in complemental alignment with each other and being adapted for a radial holding of said plurality of guide members when the latter are telescopically associated closed together and with the outer one thereof inserted within said master bore guide opening of the top plate means.

7. In a drill jig device of the class described, comprising in combination, a pair of opposed side clamp members and a top plate guide means slidable associated herewith, a master clamping screw associated with the side members, said master clamping screw serving to move the side members slidably on the top plate guide means equi-distantly toward and away from the meeting plane of the side members, said top plate guide means having one master bore guide opening therein positioned exactly in the plane of the meeting plane of the side clamping members, a first cylindrical telescoping guide bore member having a collar extending peripherally from one end thereof and being removably slidably and snugly inserted down within said master guide bore opening and with said collar resting on the top plate, said collar having a vertical opening therein, a rigid post secured to said top plate and extending upwardly therefrom adjacent the master bore opening thereof, the collar vertical opening fitting snugly and removably and slidably over said post, a second cylindrical guide bore member having a like collar to that of the first guide bore member and having an identical opening in its collar to that of the first guide bore member collar and with that collar opening fitting over said post when the second bore member is within the first bore member, the outside diameter of the second guide bore member collar being the same as the collar of the first guide bore member, said second cylindrical guide bore member having its cylindrical portion removably inserted snugly and slidably down within said first cylindrical guide bore member, and in the latter relationship of the second guide bore member within the first guide bore member then said collar opening of the second guide bore member so fits over said post, so that during operation of a drill bit within the second cylindrical guide bore member after such insert of the second guide bore member in the first guide bore member said post and collar arrangement of said guide bore members together act as means for preventing a radial turning of said guide bore members and also as means for substantially helping hold said guide bore members as inserted into and with relationship to said master guide bore opening in all directions except one.

References Cited in the file of this patent
UNITED STATES PATENTS

| | | |
|---|---|---|
| 889,273 | Thomas | June 2, 1908 |
| 1,073,362 | Redeker | Sept. 16, 1913 |
| 1,317,285 | Glaude | Sept. 30, 1919 |
| 2,338,530 | Ognibene et al. | Jan. 4, 1944 |
| 2,602,238 | Wallman | July 8, 1952 |